United States Patent [19]
Visser

[11] 3,743,108
[45] July 3, 1973

[54] OUTRIGGER
[75] Inventor: Peter J. Visser, Niles, Mich.
[73] Assignee: Clark Equipment Company, Buchanan, Mich.
[22] Filed: Jan. 31, 1972
[21] Appl. No.: 221,967

[52] U.S. Cl............... 212/145, 212/8 R, 214/77 R, 280/150.5
[51] Int. Cl............................................. B60p 1/48
[58] Field of Search..................... 214/77 R, 78, 80; 212/8 R, 59, 145; 280/150.5

[56] References Cited
UNITED STATES PATENTS
2,621,811  12/1952  Lull................................. 212/145 X
3,073,458  1/1963   Wieschel............................ 212/145
3,279,622  10/1966  Person.............................. 212/145

Primary Examiner—Robert J. Spar
Attorney—Kenneth C. Witt et al.

[57] ABSTRACT

An outrigger comprising telescopic members, the outer telescopic member being pivotally connected adjacent one side of the vehicle which it is to stabilize and extending beneath the vehicle. The other end of the outer member is connected to the vehicle by means of a bracket which is movable longitudinally along the outer member. There is a track on the bracket at an angle with the axis of the outrigger, and a guide and support member is located on the vehicle and coacts with the track.

7 Claims, 14 Drawing Figures

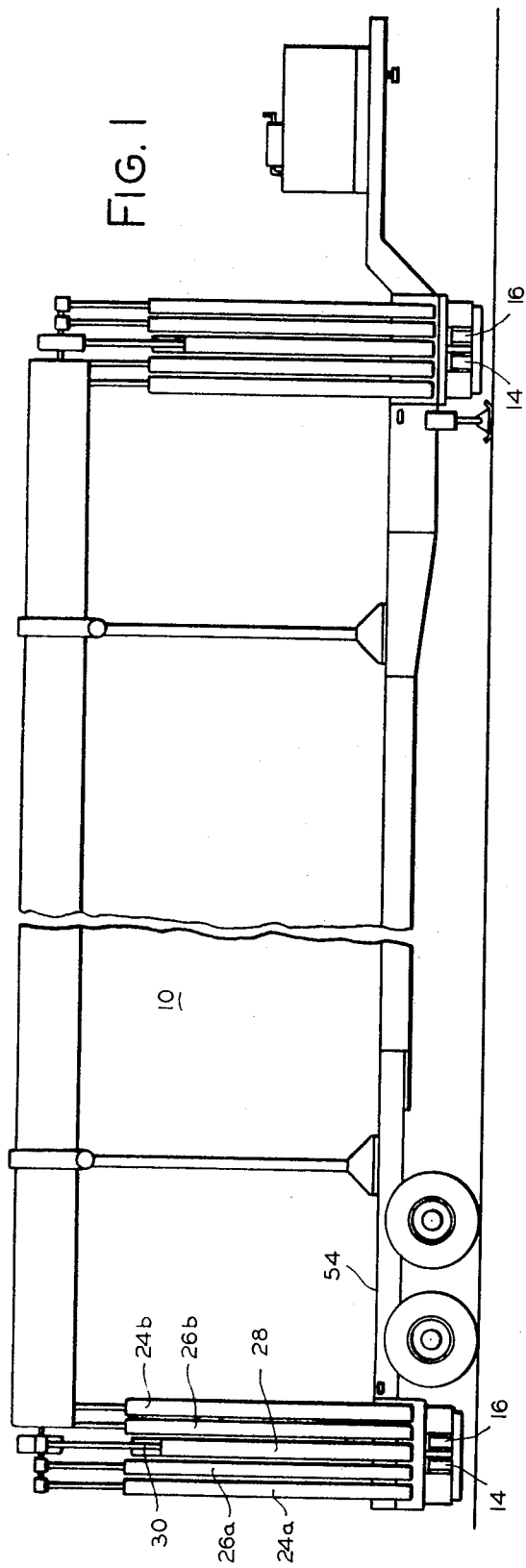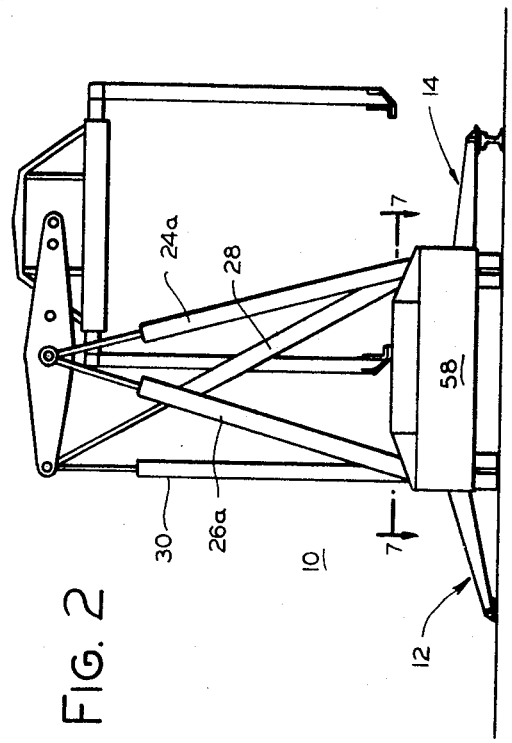

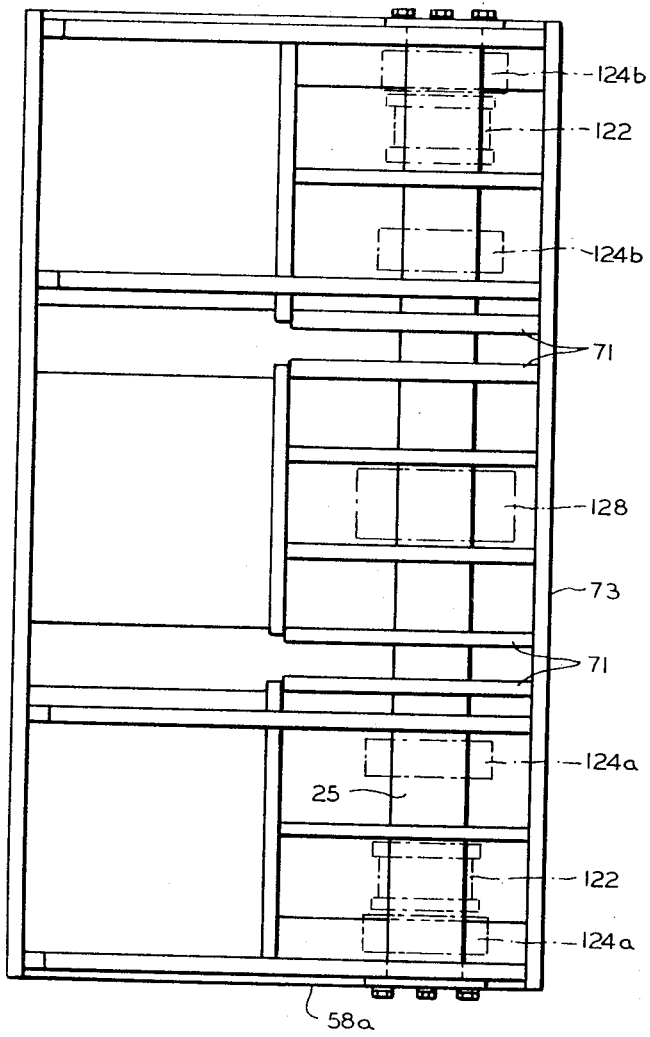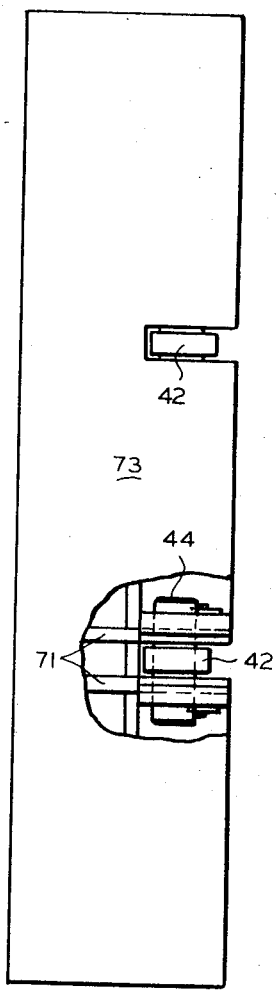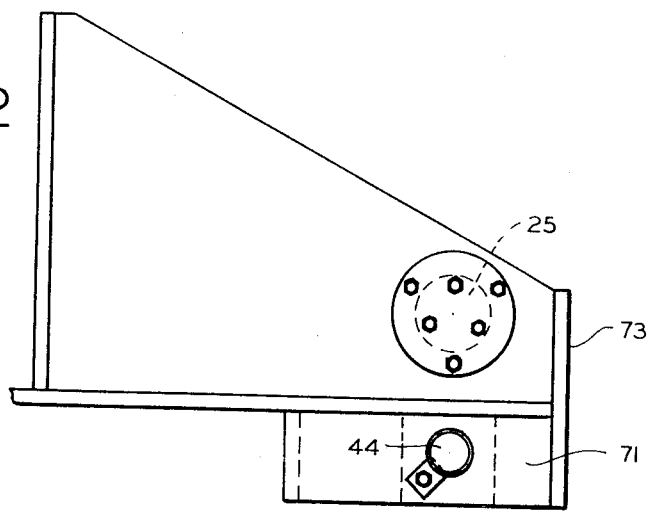

OUTRIGGER

CROSS REFERENCE TO RELATED APPLICATION

The outrigger construction of the present invention may be employed advantageously with the load transfer mechanism of U.S. Pat. application Ser. No. 187,362, filed Oct. 7, 1971, which is assigned to the same assignee as the present application. However, it will be appreciated that it is not limited to such use, but may be applied also to other load transfer and load handling mechanisms and vehicles which require stabilization.

BACKGROUND OF THE INVENTION

1. Field of the Invention

This invention relates to outrigger mechanisms utilized to stabilize load handling and load transfer mechanisms and the like and makes it possible for such mechanisms to have a greater reach without instability or overturning. The use of outriggers as stabilizers in effect extends the base of the vehicle or other mechanism and thus makes it possible to shift the center of gravity a greater distance laterally without getting it beyond the point which might result in overturning.

2. Description of the Prior Art

Various stabilizer mechanisms have been used heretofore to stabilize vehicles and other mechanisms, and attention is called to the outrigger mechanism of U. S. Pat. No. 3,073,458 dated Jan. 15, 1963. The present outrigger mechanism is similar in some respects to the outrigger mechanism of that patent, however, it provides intrinsic advantages over that patented structure and still other advantages when used as a part of a load transfer mechanism of the type disclosed in the aforementioned U. S. application Ser. No. 187,362.

SUMMARY OF THE INVENTION

In carrying out my invention in one mode, I provide an outrigger mechanism having a pair of telescopic members, the outer one of which is pivotally connected at one end adjacent one side of a vehicle, with the outrigger extending beneath the vehicle. The other end of the outer telescopic member is connected adjacent the other side of the vehicle to raise and lower such other end and thereby adjust the height of the end of the outrigger when it is extended. Such connection of the outer member adjacent the other side of the vehicle includes a bracket movable longitudinally along the outer member, a track on the bracket at an angle with the longitudinal axis of the outrigger, and a guide and support member located on the vehicle and coacting with the track.

BRIEF DESCRIPTION OF THE DRAWING

FIG. 1 shows a schematic side elevational view of a load transfer mechanism with which the outrigger mechanism of the present invention may be utilized advantageously, FIG. 2 shows a schematic end view of the load transfer mechanism of FIG. 1 with outriggers in their extended positions, FIG. 11 is a fragmentary view along the line 11—11 of FIG. 8 illustrating particularly a part of the structural portion of the mechanism, omitting many of the functional parts for this purpose, FIG. 12 is a side elevational view showing the same part of the structure as FIG. 11, and likewise omitting many of the functional parts in order to show the basic supporting structure, and FIG. 13 is a fragmentary end elevational view showing a part of the structure of FIG. 11, and showing particularly the manner in which the stub shafts 44 are secured rigidly to the remainder of the structural or box portion which houses the outriggers.

DESCRIPTION OF THE PREFERRED EMBODIMENT

Figure 3:
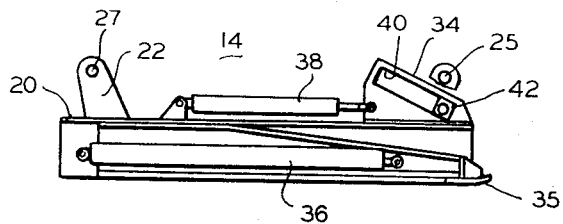
FIG. 3 shows diagrammatically one of the outriggers in FIG. 2.

FIG. 1 of the drawing shows a load transfer mechanism 10 the same as the aforementioned U. S. application Ser. No. 187,362 except for the incorporation of outriggers in accordance with the present invention in the load transfer mechanism. There are four individual outriggers at the rear portion of the load transfer mechanism housed within a transverse box portion 58, and these are indicated respectively by the numerals 12, 14, 16, and 18. See FIG. 7. At the front portion there are four similar outriggers. All outriggers are shown retracted in FIG. 1.

FIG. 2 shows a schematic end elevational view of the load transfer mechanism of FIG. 1, looking from the left, with the outriggers in the extended condition.

Figure 7:
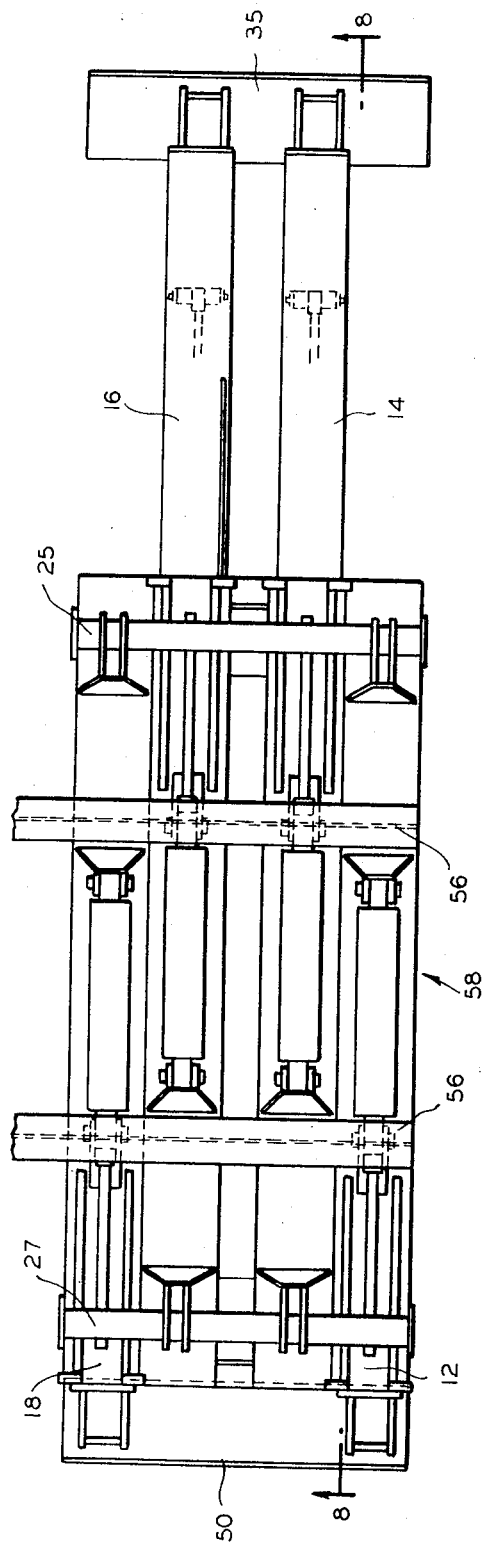
FIG. 7 shows a top plan view, along the line 7—7 in FIG. 2 with some parts omitted in order to simplify the view, illustrating four outriggers embodied in the load transfer mechanism of FIG. 1.

FIG. 3 shows schematically individual outrigger 14 in its raised and contracted position, being the second outrigger from the rear (or bottom) as seen in FIG. 7. The other individual outriggers are essentially the same. The outrigger 14 is a telescopic mechanism which includes an outer hollow elongated member 20 which is pivotally connected by means of a boss 22 to the same shaft or cylindrical journal member 27 which connects and supports the main actuators 26a and 26b and auxiliary actuator 30 of the load transfer mechanism. See FIG. 9 which shows that there are actually two bosses 22 for each outrigger in the construction shown.

As explained in the said U. S. Pat. application, the load transfer mechanism 10 comprises load manipulating main actuators 24a, 24b, 26a, 26b and auxiliary actuators 28 and 30 at the rear portion thereof. Actuators 26a, 26b and 30 are mounted on and pivotally connected to a longitudinally extending journal member 27 in a manner which is described in detail hereinafter. Similarly, main actuators 24a and 24b and auxiliary actuator 28 are pivotally connected to a longitudinally extending journal member 25.

Figure 4:
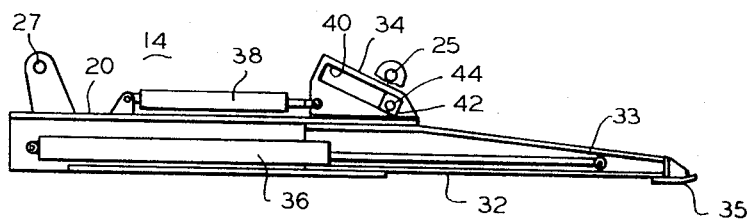
FIG. 4 shows the outrigger of FIG. 3 in an extended position.

The extendible portion of outrigger 14 is an inner member 32 which is extended and retracted by remote control by means of a conventional linear hydraulic actuator 36. The actuator 36 and the individual outrigger 14 are shown in the extended position in FIG. 4.

Figure 5:
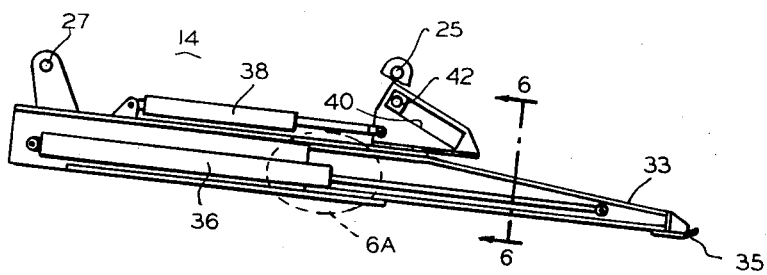
FIG. 5 shows the outrigger of FIG. 3 in an extended and lowered position.

To raise and lower the outer end of the outrigger 14 there is provided a flange member 34 which is arranged to move longitudinally of the outrigger on the outer member 20, such longitudinal movement, extension and retraction, being accomplished by means of a hydraulic actuator 38. Actuator 38 is shown in the retracted condition in FIG. 4 and in the extended condition in FIG. 5. Bracket 34 is provided with an elongated slot 40 which forms a track for a slide member 42 which is pivotally mounted on a stub shaft 44 which is located immediately below main journal member 25 and rigidly secured thereto by structure which is disclosed hereinafter.

It will be appreciated that as actuator 38 is extended, the action of track 40 on slide member 42 produces a wedging or cam action which moves the outer extremity 33 of the inner member 32 of the outrigger downwardly. Moreover, when the load transfer mechanism 10 is in operation and a load is transmitted through the journal member 25 and shaft 44 and through slide 42 and bracket 34 to the outrigger structure 20, 32 that most of the load is transmitted directly from the bracket 34 through outer member 20 to the inner member 32 of the outrigger and thence through the foot plate 35 to the ground or other support surface, with only a minor portion of the load being transmitted through the hydraulic actuator 38 to the outer member 20 of the outrigger and thence through the inner member 32 to the foot plate 35. In the illustrative construction shown, the ratio is approximately six to four, that is, approximately six tenth's of the load is transmitted from the bracket 34 directly through member 20 to the inner member 32 of the outrigger while the other four tenth's goes through the actuator 38 and the outer member 20 of the outrigger to the inner member 32. It will be understood that the proportion is dependent upon the angle of the track 40 with respect to the longitudinal axis of the individual actuator, and in the construction illustrated this angle is 20°. As the angle is increased the percentage of the load which is transmitted directly becomes smaller and the load which is transmitted indirectly becomes greater, and vice versa.

Figure 6:
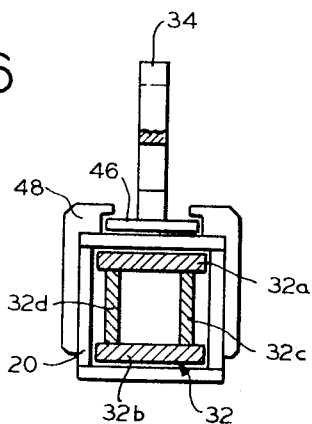
FIG. 6 shows an enlarged view along the line 6—6 of FIG. 5.

FIG. 6 shows more details of the construction of an individual outrigger, including the inner and outer members 32 and 20, respectively, and the bracket 34. Also shown is a base plate 46 which is welded or otherwise secured to the bracket 34, and members 48 which are secured to the sides of the outer member 20 to form a channel within which the base plate 46 slides as the bracket 34 moves inwardly and outwardly. This arrangement resists lateral movement of the individual outrigger as it is extended and retracted and also during operation of the load transfer mechanism, that is, lateral movement relative to the cross-sectional view of FIG. 6. Such lateral movement would be longitudinal with respect to the load transfer mechanism 10 and it is desirable, of course, to prevent any such longitudinal movement during operation of the load transfer mechanism, and the use of a plurality of individual outriggers in the manner illustrated strongly resists any tendency of the load transfer mechanism 10 to move longitudinally during operation.

Figure 6A:
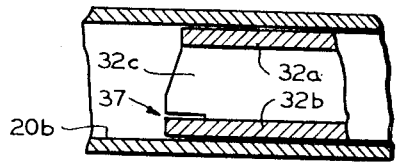
FIG. 6A shows an enlarged fragmentary view in section at the location indicated at 6A on FIG. 5.

The construction shown in the fragmentary view of FIG. 6A illustrates another feature of the present outrigger which tends to minimize stresses and strains, and reference is made particularly to the slot which is indicated at 37. As shown in FIG. 6, the inner telescopic member 32 has an upper flat portion 32a and a lower flat portion 32b which are secured together as by welding to side members 32c and 32d. At the inner extremity of the inner telescopic member 32 as illustrated in FIG. 6A, a slot 37 is provided between side 32c and bottom 32b, and a similar slot is provided between side 32d and bottom 32b. The effect of these slots is to permit the inner end of bottom 32b to flex upwardly as load is applied to the outrigger and in turn distribute the stress which is produced on the bottom 20b of the outer telescopic member over a greater area.

Referring to FIG. 7, it will be observed that the outriggers 14 and 16 are extended, to the right as the load handling mechanism is viewed in FIG. 2, while outriggers 12 and 18 remain retracted. Also, it will be observed that the foot plate 35 which is shown schematically in FIGS. 3, 4 and 5 in this case extends between outriggers 14 and 16 so that they have a common foot plate. It will be readily understood that this provides greater strength and rigidity when a pair of outriggers are used together, but that it is not essential to utilize the single foot plate for two outriggers in the broader aspects of the invention.

Similarly, there is a common foot plate 50 extending between the oppositely disposed outriggers 12 and 18 on the left side of the load transfer mechanism.

Figure 8:
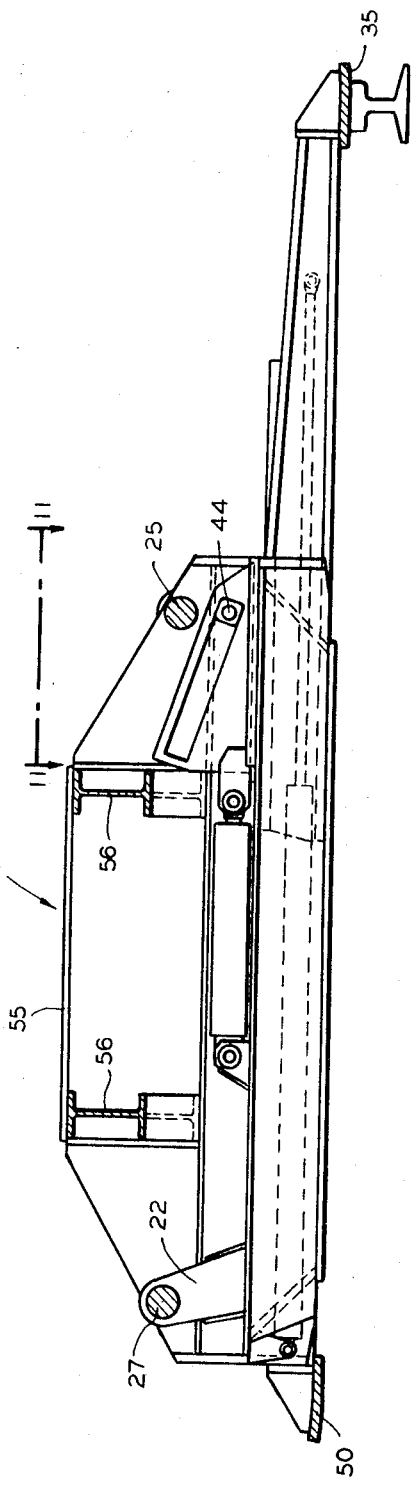
FIG. 8 is a sectional view along the line 8—8 of FIG. 7.

FIG. 8 shows a sectional view along the line 8—8 of FIG. 7 and illustrates in greater detail some of the features of an outrigger according to the present invention, including showing the foot plate 35 resting on a rail in this case, as might be necessary if the load transfer mechanism in which the outrigger is used were utilized for unloading containers, trailers or other items off of or onto railroad cars.

Both FIGS. 7 and 8 show the main longitudinal structural portion of the load transfer mechanism which is indicated generally by the numeral 54 and comprises I-beam members 56 along with suitable cross members including a top plate 55 welded thereto to form a strong beam-like structure. Top plate 55 is omitted in FIG. 4 so that the outriggers may be seen better. Secured to the beam structure 54 is a transversely disposed box-like structure 58 of structural plate material to which the main longitudinal journal members 25 and 27 are secured along with auxiliary stub shafts or journal members 44 immediately beneath them.

The left-hand journal members 44 are not visible in FIG. 8, however, it will be understood that both sides of the structure of the cluster of four outriggers are similar with each having a longitudinal main journal member and two auxiliary journal members. In each case the main journal member and the auxiliary journal members are rigidly secured together by means of the structural plate portions which hold them, so that load is transferred directly between the main journal members and auxiliary journal member in each case with a minimum of stress and strain on the transverse structure 58 and also on the longitudinal beam portion 54.

Figure 9:
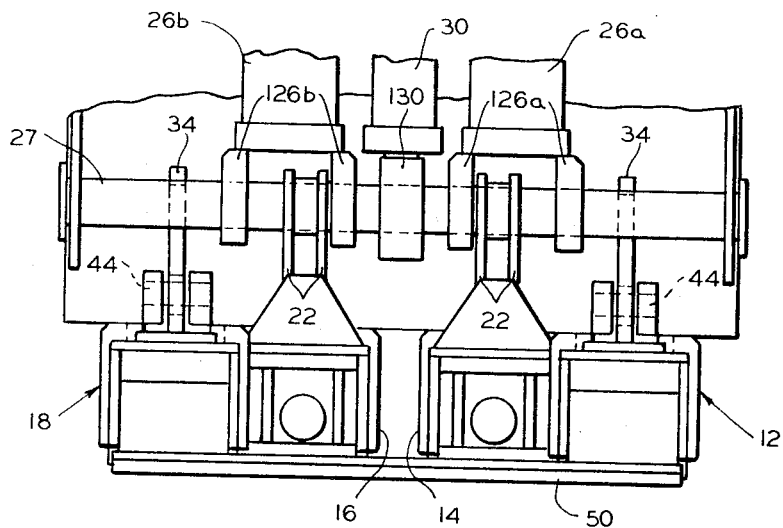
FIG. 9 is an end view from the left of FIG. 7 with all individual outriggers retracted.
Figure 10:
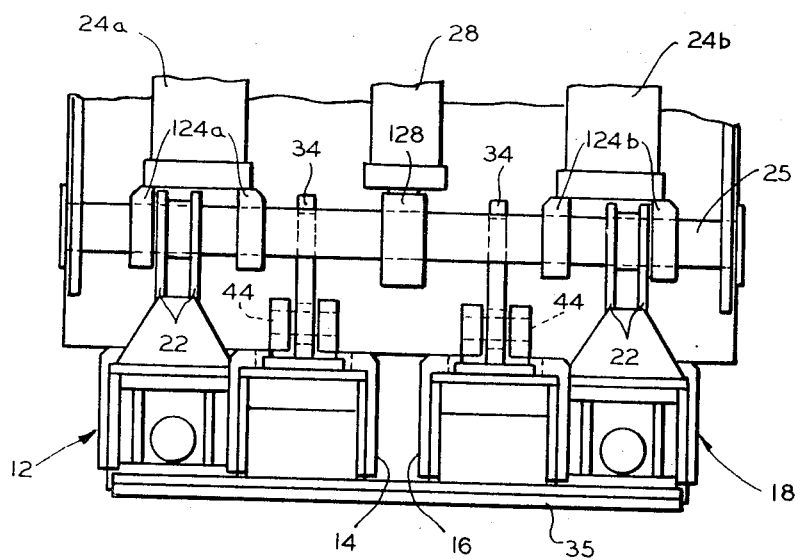
FIG. 10 is an end view from the right of FIG. 7 with all individual outriggers retracted.

FIGS. 9 and 10 show views from the left and right, respectively, of the cluster of outriggers and the structure by which they are secured to the load handling mechanism. In the particular load handling mechanism 10 which is illustrated in FIG. 1, there are two sets of such outriggers, one at the rear end and the other at the front, each consisting of a total of four outriggers.

As may be seen in FIGS. 9 and 10, the actuators 26b and 26a are both pivotally journalled on member 27 by means of bifurcated portions which are designated by the numerals 126a for actuator 26a and 126b for actuator 26b. Auxiliary actuator 30 is pivotally mounted on member 27 by means of a journal portion 130. Similarly in FIG. 10, main actuators 24a and 24b are journalled on member 25 by means of bifurcated portions 124a and 124b respectively, while auxiliary actuator 28 is pivotally supported on member 25 by means of a single journal portion 128. In both FIGS. 9 and 10, it may be seen also that bifurcated bosses 22 which carry the one extreme end of each outrigger are pivotally connected on journal member 27 or 25 as the case may be.

In order to illustrate the rigid structure which is provided to connect the various portions of the mechanism together and to provide for transmittal of loads from the load transfer mechanism above to the outriggers below, FIG. 11 has been included. This figure is a fragmentary view showing an illustrative construction of the right end 58a (as seen in FIG. 2) of the transversely disposed box-like structure 58 which houses the four outriggers at the rear of the load transfer mechanism 10. The numerous braces and other structural members in the portion shown in FIG. 11 are preferably welded together to form a rigid structure, and shaft or journal member 25 extends through suitable openings in the braces and other members.

To illustrate the relation between FIGS. 11 and 10, the bifurcated portions which support the main actuators 24a and 24b in FIG. 10 have been shown in phantom and indicated respectively by the numerals 124a and 124b, and the single journal portion for auxiliary actuator 28 has been shown in phantom and indicated by the numeral 128. It will be appreciated that bosses 22 are journalled respectively at the locations indicated by the numerals 122 in FIG. 11.

Included in the structure of FIG. 11 are plate portions 71 which are welded into the main structure but also have depending portions as illustrated in FIGS. 12 and 13 which are right angle projections from FIG. 11. Part of the front plate member 73 is broken away in FIG. 13. The downwardly projecting parts of plate members 71 carry stub shafts 44 and slide members 42 thereon, which coact with the track slots 40 in the brackets 34 to provide for raising and lowering the outriggers to get them into the proper position and also provide for direct transmittal of a portion of the load from the load transfer mechanism above directly to the outriggers through the weldment 58a inasmuch as the stub shafts 44 and the journal member 25 form a part of the same rigid structure.

It will be appreciated that there is a similar structure to that shown in FIG. 11 at the opposite end of the transverse box-like structure 58 at the rear of the load transfer mechanism, and further that there may also be another similar cluster of four outriggers at the front of the load transfer mechanism 10.

While I have described and illustrated herein a preferred embodiment of my invention, it will be understood that modifications may be made by those skilled in the art. Accordingly, it should be understood that I intend to cover by the appended claims all such modifications which fall within the true spirit and scope of my invention.

I claim:

1. An outrigger comprising an outer hollow elongated member, a connection adjacent one end of the said outer member for pivotally connecting the said outer member to a load handling mechanism in a horizontally disposed position, an inner member carried by the said outer member and movable outwardly and inwardly of the outer member, and means for raising and lowering the other end of the said outer member, the said means comprising a bracket movable longitudinally along the said outer member, a track on the said bracket at an angle with the longitudinal axis of the said outer member, a guide and load transfer member located on the load handling machine and coacting with the said track, and means for moving the said bracket inwardly and outwardly.

2. An outrigger mechanism as specified in claim 1 in which the elements specified therein are duplicated to form another outrigger connected to the load handling mechanism, but oppositely disposed with respect to the first outrigger.

3. An outrigger mechanism as specified in claim 2 in which there are at least two of the said outriggers disposed in each direction and parallel relation and there is a common foot plate carried by each two of the outriggers respectively.

4. An outrigger as specified in claim 1 in which there is a second track along the top of the said outer member and the said bracket has a portion thereon movable along the said track.

5. An outrigger as specified in claim 1 in which the inner end of the said inner member has a bottom part which is flexible upwardly in order to better distribute the stress and strain between the inner member and the said outer member.

6. In a load handling machine, a horizontally disposed journal member, a vertically disposed load manipulating actuator pivotally connected to the said journal member, a horizontally disposed outrigger comprising an outer hollow elongated member pivotally connected adjacent one end thereof to the said journal member, an inner member carried by the said outer member and movable outwardly and inwardly of the outer member, means for raising and lowering the other end of the said outer member, the said means comprising a bracket movable longitudinally along the said outer member, a track on the said bracket at an angle with the longitudinal axis of the said outer member, a guide and load transfer member located on the load handling machine and coacting with the said track, and means for moving the said bracket inwardly and outwardly.

7. In a load handling machine, a pair of horizontally disposed journal members located respectively adjacent opposite sides of the machine, at least one vertically disposed load manipulating actuator pivotally connected to each of the said journal members, at least one telescopic outrigger pivotally connected to each of the said journal members in horizontally disposed relation, each said outrigger extending from the said pivotal connection beneath the load handling machine toward the other side thereof, each said outrigger comprising an outer hollow elongated member which is pivotally connected to its respective journal member, an inner member carried by the said outer member and movable outwardly and inwardly of the outer member, means for raising and lowering the other end of the said outer member, the said means comprising a bracket movable longitudinally along the said outer member, a track on the said bracket at an angle with the longitudinal axis of the said outer member, a guide and load transfer member located on the load handling machine and coacting with the said track, each said guide and load transfer member being located closely adjacent and firmly connected to the adjacent journal member on the load handling machine, and means for moving the respective brackets inwardly and outwardly.

* * * * *